March 19, 1968  R. C. KELLER  3,373,625
BACKLASH REDUCING MECHANISM
Filed Aug. 19, 1966
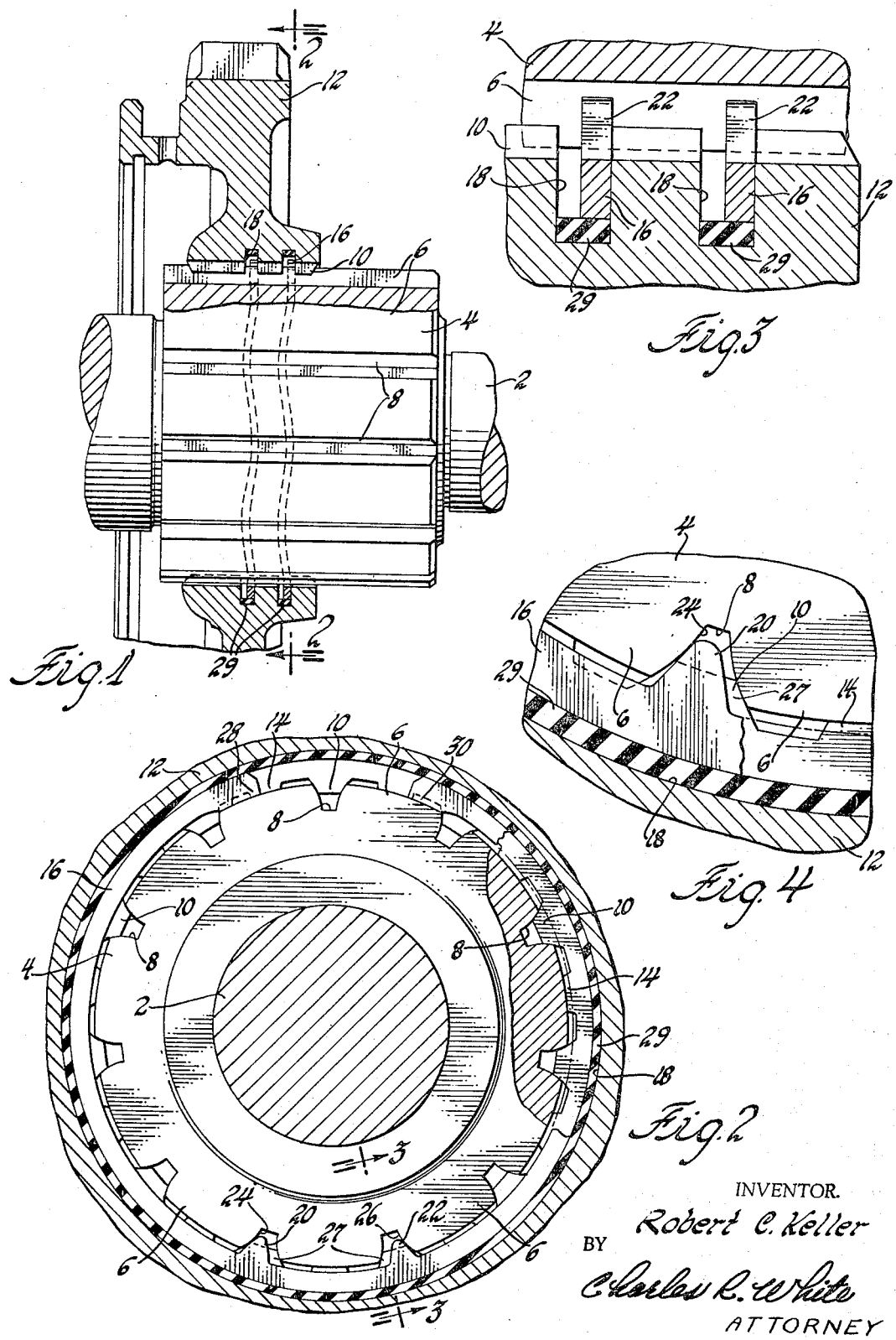
INVENTOR.
Robert C. Keller
BY
Charles R. White
ATTORNEY 3,373,625
BACKLASH REDUCING MECHANISM
Robert C. Keller, Birmingham, Mich., assignor to General Motors Corporation, Detroit, Mich., a corporation of Delaware
Filed Aug. 19, 1966, Ser. No. 573,692
12 Claims. (Cl. 74—409)

This invention relates to splined gear and shaft constructions and more particularly to a backlash reducing mechanism for diminishing or eliminating relative oscillations and resultant noises between the gear and shaft especially when the gear is running free with the shaft.

Many change speed vehicle transmissions are provided with a splined main shaft having a plurality of gears slidably disposed thereon which are actuated by manipulation of shifter forks or other operators to accomplish ratio change. Ordinarily these gears are formed with internally splined hubs fitted over the external splines of the main shaft. Since such gears must be shiftable longitudinally on the main shaft to accomplish ratio change, backlash or clearance is necessary to insure a sliding fit so that the ratio change can be easily accomplished. Prior to the present invention it has been found that when the internal splines of the gear are provided with sufficient backlash to permit the necessary freedom of longitudinal movement, the gears have a tendency to oscillate on the shaft when running under a no-load condition. This is believed due primarily to engine firing impulses and uneven power transmittal by the main shaft. This gear oscillation produces objectional rattle or noise and some mechanical wear which can be substantially reduced or eliminated by this invention.

Thus, an object of this invention is to provide improved mechanism for reducing the rattle or noise of gears running free with a rotating splined member.

Another object of this invention is to provide a circumferentially disposed, flexible, backlash reducing mechanism simultaneously engaging an externally splined shaft and an internally splined gear slidably disposed on the shaft.

Another object of this invention is to provide a backlash reducing mechanism between a sliding gear and a splined member including flexible means therebetween having spaced elements biased into engagement with opposing sides of spaced splines.

Another object of this invention is to provide a new and improved backlash compensating device between a sliding gear and a splined shaft which facilitates the axial movement of the gear relative to the shaft and reduces gear oscillations about the axis of the shaft and gear rocking about an axis normal to the shaft.

These and other objects of the invention will become more fully apparent from the following detailed description and drawings in which:

FIGURE 1 is a side elevational view of a portion of a power transmission with parts broken away and with parts in section;

FIGURE 2 is a front elevational view taken along line 2—2 of FIGURE 1;

FIGURE 3 is a fragmentary sectional view taken along line 3—3 of FIGURE 2;

FIGURE 4 is an enlarged front elevational view illustrating a portion of FIGURE 2.

Referring now to the drawings, there is shown in FIGURE 1 a portion of a power transmission having a main shaft 2 provided with an enlarged portion 4 formed with longitudinally extending external splines or teeth 6. These splines have grooves 8 therebetween, into which internal splines or teeth 10 of sliding gear 12 extend. The gear 12 is also provided with additional splines 14 sequentially disposed between splines 10 which engage the top lands of spline 6 as illustrated best by FIGURE 2.

To enable the gear 12 to be axially shifted into and out of engagement with other gears, not shown, for effecting ratio change, the meshing splines are provided with backlash which can be defined as tooth space (groove 8) minus the tooth thickness (spline 10) as measured on the pitch circle. Backlash provision further permits lubricant to reach all parts of the splines or teeth and allows for tooth expansion due to heat.

To reduce or eliminate oscillatory movement of the gear 12 through the backlash and resultant noise and wear, specially constructed rings 16 are provided to closely connect the gear and the splined portion 4. These rings are generally circular elements but have free end portions as shown in FIGURE 2. The rings are mounted in spaced annular grooves 18 formed internally of the gear and are cut at right angles through the splines 10 and 14. The rings are waved as shown in dotted lines in FIGURE 1, and alternately contact the sides of their respective grooves to securely connect the ring to the gear. Each ring has two spaced teeth 20 and 22 which extend radially inwardly therefrom and engage the opposite faces 24 and 26 of two of the spaced splines 6 as shown. As illustrated in FIGURES 2 and 4, there is a clearance 27 between the teeth 20 and 22 and the two faces of the spline therebetween so that drag is diminished when gear 12 is axially moved.

Each of the rings also has inwardly projecting lug portions 28 and 30 at the free ends thereof which rest on the top lands of spaced splines 6 of the main shaft. These lugs are such that when the gear 12 and connected ring 16 are installed on the splined shaft the spaced lugs will engage the top lands, expand the ring and bias the teeth 22 and 24 of the ring outwardly in opposite directions and into a close fit with the opposing faces of the splines. When the teeth are in engagement with these spline faces, the gear 12 can still be axially moved along the splined portion 4 of the main shaft due to the small area of contact between the ring and splines 6. However, due to the close contact between the faces 24 and 26 and the teeth 20 and 22, there will be reduced relative rotatable or oscillatory movement between these two elements. If desired, an elastomeric ring 29 can be positioned between each ring and the groove to cause the rings to grip the splined portion 4. The rings are preferably formed from spring steel material but other suitable resilient materials may be substituted, if desired.

In operation assuming that the gear 12 is in a no-load condition, there will be little or no rattle of the gear on the splined portion 4 due to the fact that the rings have provided for a close fit between the sliding gear and the splined portion 4.

The provision of two or more axially spaced rings will reduce any tendency for gear 12 to rock on an axis disposed at an angle to the axis of the main shaft. However, if desired, only one ring may be employed.

Manufacture of this backlash reducing mechanism as compared to other mechanisms of this character is facilitated since only two teeth are formed on each ring and tolerance requirements are reduced. With rings having more than two teeth, closer tolerances have to be held to insure a proper mating of the teeth. Furthermore, in this invention the desired close fit is assured since the teeth are biased into engagement with opposing surfaces of the splines instead of being in a contracting and gripping engagement.

While a preferred embodiment of the invention has been shown and described, it will be apparent that other changes and modifications may be made therein. It is therefore not intended to limit the invention to the em-

I claim:

1. A mechanism for reducing relative rotation between members splined to each other, said mechanism including a connecting member having a plurality of spaced projections thereon, each of said projections extending into an aligned groove between adjacent splines of one of said members, and means for biasing each of said projections into engagement with a spline face and away from engagement with the next adjacent spine face.

2. The mechanism defined in claim 1 in which said connecting member is a curved resilient element, means for securing said resilient element to the other of said splined members, said biasing means being provided by spaced contact members on said element.

3. The mechanism defined in claim 2 wherein said contact members and said projections extend radially inwardly from said resilient element, said projections extending inwardly at a greater distance than said contact members.

4. The mechanism defined in claim 2 wherein said contact members engage at least one of the top lands of one of said splined members.

5. The mechanism defined in claim 2 wherein each of said projections is a tooth member that engages one face of a corresponding spline and is spaced from the next adjacent spline face.

6. The mechanism defined in claim 2 in which one of said splined members is provided with a groove therein receiving and retaining said resilient element.

7. The mechanism defined in claim 1 and further including a second connecting member having a plurality of spaced projections thereon, each of said last mentioned projections extending into an aligned groove between adjacent splines on one of said members, and means for biasing each of said last mentioned projections into engagement with a spline face and away from engagement with the next adjacent spline face.

8. In combination, a first rotatable member having external teeth, a second member slidably mounted on said first member and having internal teeth which mesh with the teeth of said first member, resilient means secured to one of said members and engaging the other of said members for reducing relative rotation therebetween, said resilient means including a plurality of spaced projections and means for biasing one of said projections into engagement with one side of one tooth of one of said rotatable members and simultaneously biasing another of said projections into engagement with an opposing side of another tooth of one of said rotatable members.

9. The combination of claim 8, said resilient means being a circular spring steel member having free end portions, said biasing means being formed by inwardly projecting contact members formed on said free end portions, each of said contact members engaging a corresponding top land of the teeth of said first rotatable member.

10. The combination of claim 8 wherein said projections are first and second spaced tooth members, each of said tooth members extending into a corresponding groove between the teeth of said first member, said biasing means being formed on said resilient means and contacting spaced top lands of the teeth of said first member, said biasing means being operative to expand said resilient means and bias said tooth members in opposite directions and into close engagement with opposing faces of two alternate teeth of said first member.

11. The combination of claim 10 wherein said first member is a shaft and said second member is a gear, said resilient means being expanded when mounted on said shaft so that said projections closely engage opposing surfaces of spaced teeth on said shaft, said flexible means then being operative to reduce relative oscillatory movement between said shaft and gear and accordingly reduce gear rattle when said gear runs freely with said shaft.

12. In combination, an externally spined shaft, a gear member internally splined to slidably fit on said shaft, and axially spaced resilient means interposed between said gear and said shaft to resist oscillation of said gear on said shaft and rocking of said gear with respect to an axis disposed at an angle to said shaft.

References Cited

UNITED STATES PATENTS

| 2,615,315 | 10/1952 | Werner | 64—27 X |
| 2,737,033 | 3/1956 | Bendall | 64—14 |
| 3,093,007 | 6/1963 | Aebersold | 74—409 X |
| 3,320,824 | 5/1967 | Riley et al. | 74—443 |

ROBERT M. WALKER, *Primary Examiner.*

LEONARD H. GERIN, *Examiner.*